United States Patent
Watanabe et al.

(10) Patent No.: US 6,274,256 B1
(45) Date of Patent: Aug. 14, 2001

(54) THIN FILM MAGNETIC HEAD

(75) Inventors: Toshinori Watanabe; Atsushi Sato; Akira Takahashi, all of Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/241,349

(22) Filed: Feb. 1, 1999

(30) Foreign Application Priority Data

Feb. 3, 1998 (JP) .................................................. 10-021844

(51) Int. Cl.$^7$ ...................................................... G11B 5/66
(52) U.S. Cl. ..................... 428/692; 428/694 T; 428/900; 360/113; 360/126
(58) Field of Search ................................. 360/113, 126; 428/692, 694 T, 900

(56) References Cited

U.S. PATENT DOCUMENTS 5,224,002 * 6/1993 Nakashima et al. ................. 360/126
5,751,522   5/1998 Yamada et al. ...................... 360/113

FOREIGN PATENT DOCUMENTS 06119618   4/1994 (JP) .
06124415   5/1994 (JP) .

* cited by examiner

Primary Examiner—Leszek Kiliman
(74) Attorney, Agent, or Firm—Brinks Hofer Gilson & Lione

(57) ABSTRACT

A product (S×Bs) of a cross-sectional area of a tip portion of an upper core layer (S) (a thickness of a layer d1 by a track width Tw) and a saturation magnetic flux density thereof (Bs) is in a range of 1.5 to 10.5 $\mu m^2 \cdot T$, and preferably in a range of 4.0 to 8.0 $\mu m^2 \cdot T$. Further, a magnetic pole straight length L1 ranges from 3.5 to 7.6 $\mu M$. Thus, excellent NLTS and OW characteristics can be simultaneously obtained.

2 Claims, 8 Drawing Sheets

THIN FILM MAGNETIC HEAD

BACKGROUND OF THE INVENTION

1. Field of the Invention

The present invention relates to a thin film magnetic head in which a coil layer is provided between core layers, and more particularly to a thin film magnetic head in which an excellent non-linear transition shift (hereinafter referred to as NLTS) characteristic and an excellent overwrite (hereinafter referred to as OW) characteristic can be simultaneously obtained.

2. Description of the Related Art

FIG. 8 is an enlarged detail of a conventional thin film magnetic head showing a construction of a facing surface facing a recording medium. FIG. 9 is a longitudinal sectional view of the thin film magnetic head shown in FIG. 8. FIG. 10 is a fragmentary isometric view of an entire construction of the conventional thin film magnetic head.

The thin film magnetic head shown in FIGS. 8 to 10 is a combined-type thin film magnetic head in which a read-out head h1 using a magnetoresistive effect and an inductive magnetic head h2 for writing a signal on a recording medium such as a hard disk are laminated. As shown in FIG. 10, the thin film magnetic head is provided at a trailing side end surface 12a of a slider 12 of a floating type magnetic head.

Reference numeral 20 in FIGS. 8 to 10 indicates a lower core layer which is made of a magnetic material having a high magnetic permeability such as an Fe—Ni based alloy (Permalloy). The lower core layer 20 functions also as an upper shielding layer of the read-out head h1 using a magnetoresistive effect. A gap layer 21 which is made of a nonmagnetic material such as $Al_2O_3$ (aluminum oxide) is formed on the lower core layer. As shown in FIG. 9, an insulating layer 22 which is made of organic resin materials including resist materials are provided on the gap layer 21.

Coil layers 23 which are made of an electric conductive material having a low electric resistance such as Cu are helically provided on the insulating layer 22. As shown in FIG. 9, an insulating layer 24 which is made of organic resin materials including resist materials is formed on the coil layers 23. Further, a magnetic material such as Permalloy is plated on the insulating layer 24 to form an upper core layer 25. As shown in FIG. 8, a protective layer 26 is provided on the upper core layer 25.

As shown in FIG. 10, the upper core layer 25 includes a tip portion A having a constant width and a rear end portion B which gradually becomes wider starting from the tip portion A toward the rear end side. As shown in FIG. 9, the tip of the tip portion A is connected with the lower core layer 20 by interposing the gap layer 21 at a facing portion facing onto a recording medium so as to form a magnetic gap having a gap length of Gl1. In addition, as shown in FIGS. 9 and 10, a base end portion 25a of the upper core layer 25 is magnetically brought into contact with the lower core layer 20 through a groove formed at the gap layer 21 and the insulating layer 22.

With respect to the inductive magnetic head for writing h2, when a recording current is applied to the coil layer 23, a recording magnetic field is induced in the lower core layer 20 and the upper core layer 25. Thus, a magnetic signal is recorded on a recording medium such as a hard disk using a leakage magnetic field from a magnetic gap portion between the tip of the lower core layer 20 and the tip of the upper core layer 25.

In addition, as shown in FIGS. 8 to 10, the read-out head h1 which is provided under the inductive magnetic head h2 comprises a lower shielding layer 30 which is made of a magnetic material, a magnetoresistive device layer 32 which is provided on the lower shielding layer 30 by interposing a lower gap layer 31, and an upper shielding layer 20 (a lower core layer) which is formed on the magnetoresistive device layer 32 by interposing an upper gap layer 33.

When the recording density becomes higher, a leakage magnetic field which arises at a magnetic gap between the core layers 20 and 25 in the inductive magnetic head h2 shown in FIGS. 8 to 10 is affected by a leakage magnetic field which arises in a direction starting from a recording signal immediately recorded on a recording medium to the head side. Thus, nonlinear distortion arises so as to easily induce a phase shift (that is, NLTS). This NLTS characteristic greatly depends on the configuration of the portion A of the upper core layer 25. In addition, an important recording characteristic in addition to the NLTS characteristic is the OW characteristic.

The term "overwrite" means "double write". The OW characteristic is evaluated as follows. A signal is recorded at a low frequency and then another signal is overwritten at a high frequency. The OW characteristic is evaluated by the degree of decrease in a residual output power of the recording signal at a low frequency in the overwritten state compared with that before overwriting at a high frequency.

The OW characteristic also depends on the configuration of the tip portion A of the upper core layer 25 similarly to the NLTS characteristic. Conventionally, the tip portion A has been appropriately configured to be excellent in only one of the NLTS and OW characteristics, and excellent NLTS and OW characteristics cannot be simultaneously obtained.

SUMMARY OF THE INVENTION

The present invention intends to overcome the above-described problem. In particular, it is an object of the present invention to provide a thin film magnetic head capable of simultaneously obtaining excellent NLTS and OW characteristics by forming a tip portion of an upper core layer in a proper size.

According to one aspect of the present invention, there is provided a thin film magnetic head including: a lower magnetic core layer and an upper magnetic core layer separated by a coil layer therebetween for inducing a recording magnetic field to the lower and upper core layers; wherein the upper core layer includes a tip portion having a constant width starting from a facing portion facing onto a recording medium to the rearward direction which is distant from the recording medium, and a rear end portion which rearwardly becomes larger in width from the tip portion; and when a product (S×Bs) of a cross-sectional area of the tip portion (S) and a saturation magnetic flux density of a magnetic material consisting the upper core layer (Bs) is in a range of 1.5 to 10.5 $\mu m^2 \cdot T$.

Furthermore, in accordance with the present invention, the product (S×Bs) is preferably in a range of 4.0 to 8.0 $\mu m^2 \cdot T$.

Still furthermore, in accordance with the present invention, a length of the tip portion in the distant direction from the recording medium is preferably in a range of 3.5 to 7.6 $\mu m$.

In the conventional art, excellent NLTS and OW characteristics cannot be simultaneously obtained. However, in accordance with the present invention, the configuration of a tip portion of an upper core layer is improved so as to simultaneously obtain excellent NLTS and OW characteristics.

DESCRIPTION OF THE PREFERRED EMBODIMENT

Figure 3:
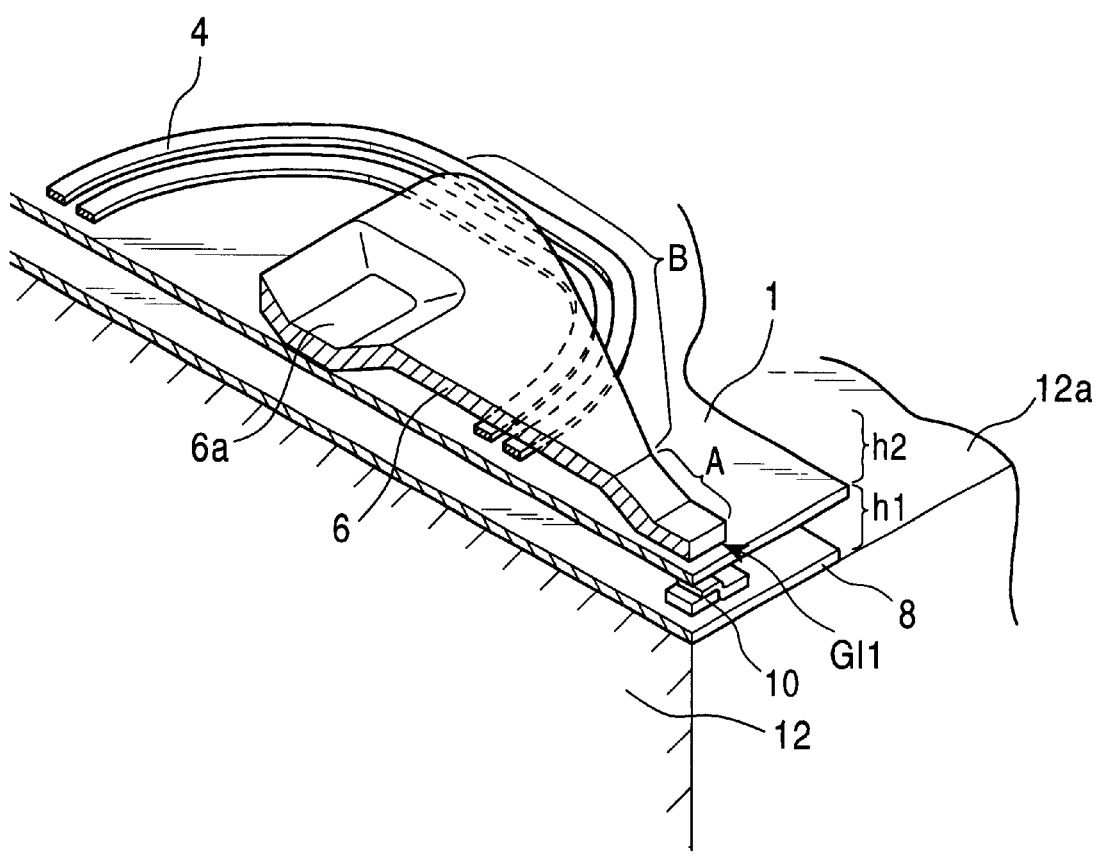
FIG. 3 is a fragmentary isometric view of an entire construction of the thin film magnetic head in accordance with the present invention.

As shown in FIG. 3, the upper core layer 6 includes a tip portion A having a constant width (a track width; hereinafter referred to as Tw) elongated in the direction which is distant from a recording medium (a depth direction), and a rear end portion B in which the width gradually becomes larger in the rearward direction starting at the tip portion A.

The NLTS and OW characteristics greatly depend on both the product (S×Bs) of the cross-sectional area of the tip portion A (S) and the saturation magnetic flux density of the soft magnetic material consisting the upper core layer 6 (Bs), and the length of the tip portion A shown in FIG. 2 (hereinafter referred to as a magnetic pole straight length L1). In the present invention, the product (S×Bs) and the magnetic pole straight length L1 were obtained on the basis of experiments.

Figure 1:
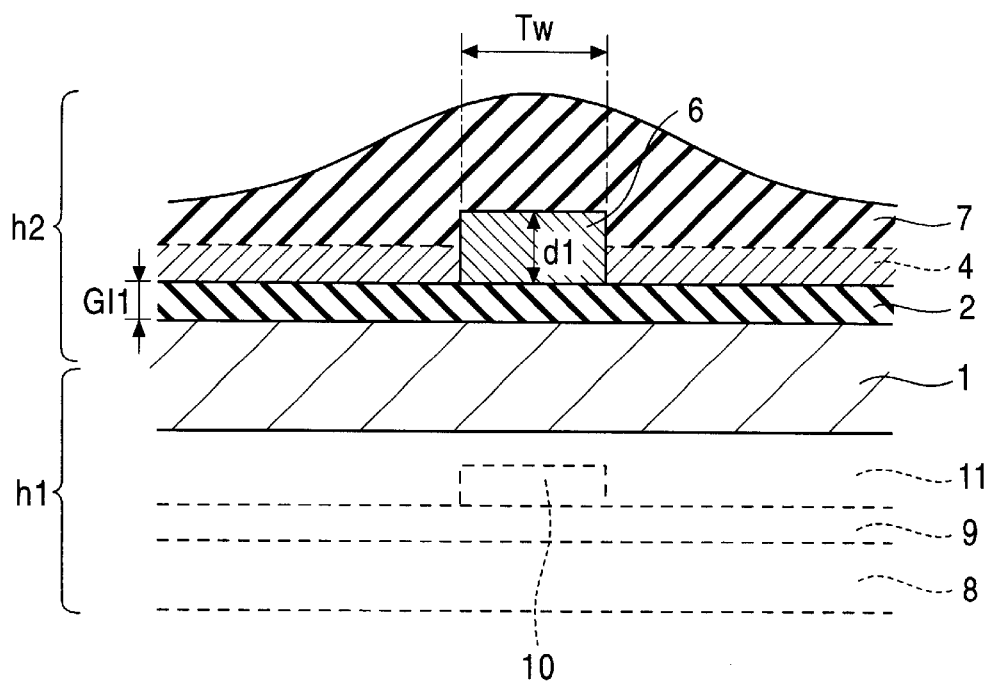
FIG. 1 is an enlarged detail of a thin film magnetic head according to an embodiment of the present invention.
Figure 2:
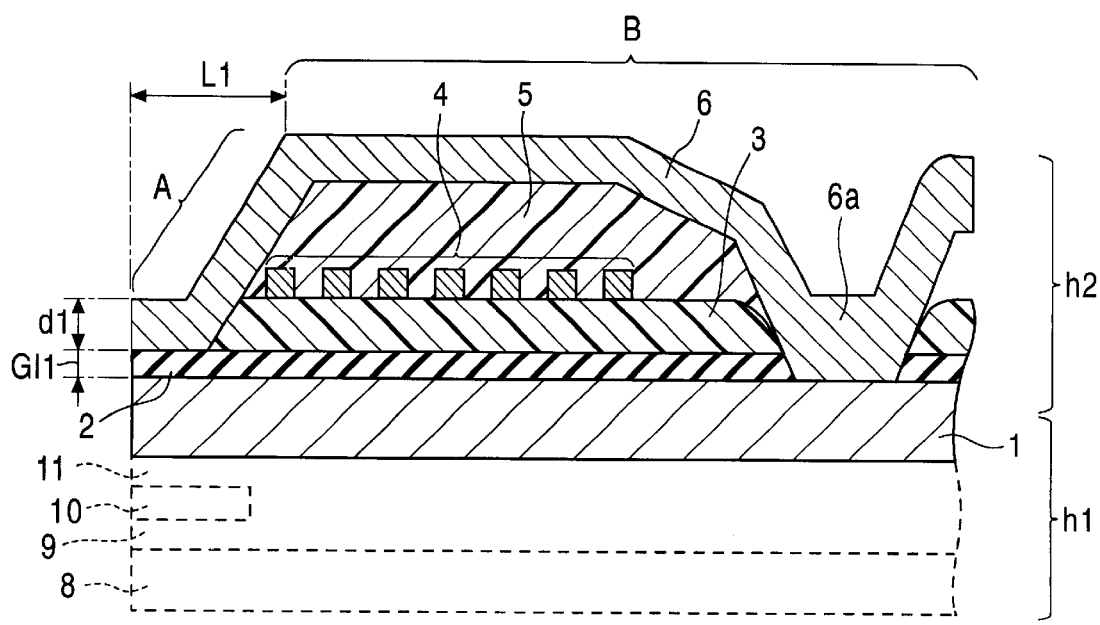
FIG. 2 is a longitudinal sectional view of the thin film magnetic head shown in FIG. 1.

First, in the present invention, when the thickness of a film d1 at the tip portion A of the upper layer core layer 6 shown in FIGS. 1 and 2 was varied, the relationship between the thickness of the film d1 and the NLTS and OW characteristics were evaluated. The soft magnetic material used for the upper core layer 6 in the experiment was an $Fe_{55}Ni_{45}$-based alloy, and its saturation magnetic flux density (Bs) was 1.4 T (tesla). The above-mentioned subscript figures indicate atomic percent. In addition, the width of the tip portion A of the upper core layer 6 (a track width Tw; see FIG. 1) was determined as 2 $\mu$m, and the magnetic pole straight length (see FIG. 2) was determined as 3.5 $\mu$m or 6.5 $\mu$m. The NLTS characteristic is measured using a fifth harmonic method which is developed by International Business Machines Corporation (IBM). The absolute value of the NLTS characteristic is preferably large. In the present invention, the absolute value of the NLTS characteristic is preferably not less than 10 dB.

In addition, with respect to measurement of the OW characteristic, a signal was recorded on a recording medium at a low frequency and then another signal was overwritten at a high frequency. The OW characteristic was evaluated by the degree of decrease in residual output power of the recording signal at a low frequency in the overwritten state compared with that before overwriting using dB as a unit. The absolute value of the OW characteristic is preferably large. In the present invention, the absolute value of the OW characteristic is preferably not less than 30 dB.

Figure 4:
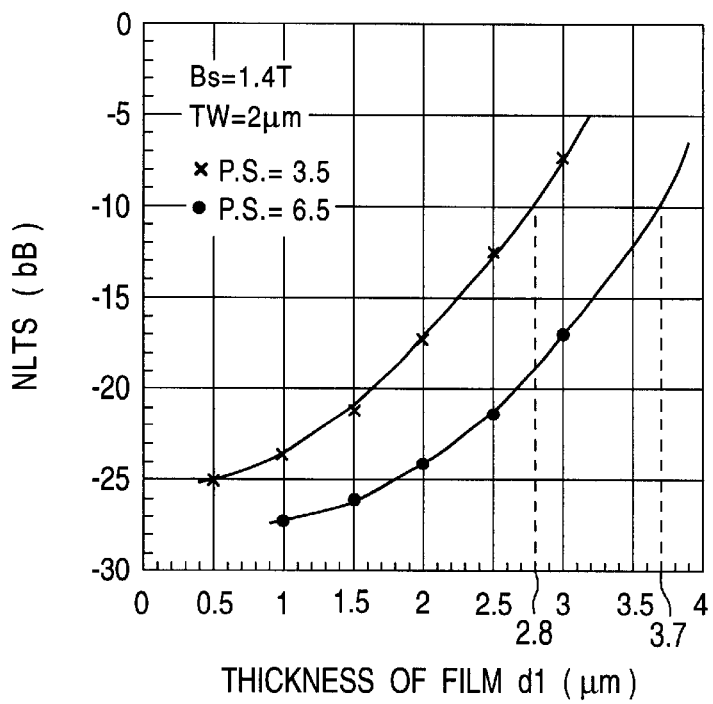
FIG. 4 shows the relationship between a thickness of a film d1 at a tip portion of an upper core layer and NLTS characteristic.

As shown in FIG. 4, the larger the thickness of the tip portion A of the upper core layer 6, the smaller the absolute value of the NLTS characteristic, so that it is clear that the NLTS characteristic deteriorates. With respect to the NLTS characteristic, the configuration of the tip portion A of the upper core layer 6 is preferably formed in such a manner that when a leakage magnetic field from a recording medium magnetizes a recording core, the magnetic field applied by a gap of the magnetized core becomes small, that is, the strength of a demagnetizing field becomes small. Therefore, the smaller the thickness of the film d1, the smaller the demagnetizing field, so that a more excellent NLTS characteristic can probably be obtained.

According to thicknesses of the film d1 shown in FIG. 4 in the case of the absolute value of the NLTS characteristic being not less than 10 dB, when the magnetic pole straight length L1 was 3.5 $\mu$m, the thickness of the film d1 was not more than about 2.8 $\mu$m. When the magnetic pole straight length L1 was 6.5 $\mu$m, the thickness of the film d1 was not more than about 3.7 $\mu$m. Thus, the longer the magnetic pole straight length L1, the broader the range of the thickness of the film d1.

Figure 5:
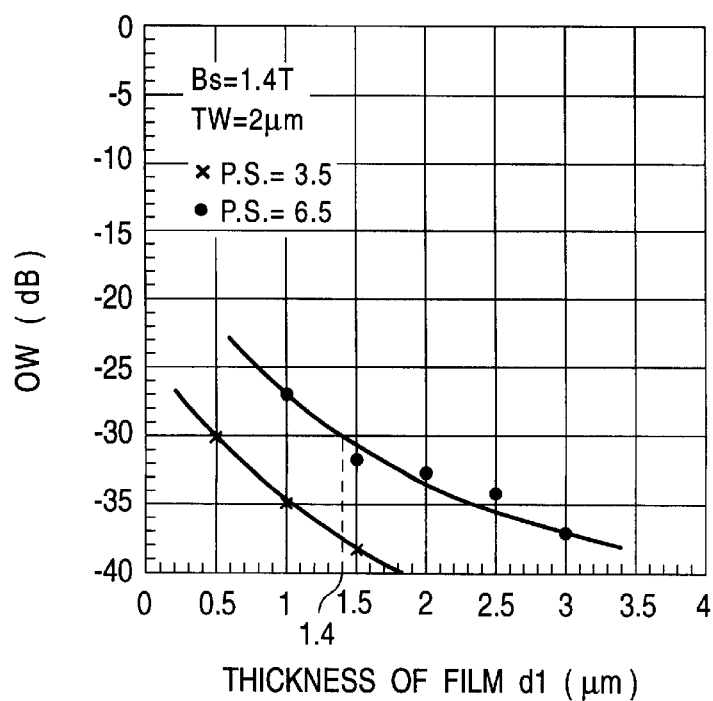
FIG. 5 shows the relationship between a thickness of the film d1 at the tip portion of the upper core layer and OW characteristic.

As shown in FIG. 5, the larger the thickness of the film, the smaller the absolute value of the OW characteristic. The reason that a more excellent OW characteristic can be obtained at a larger thickness of the film d1 is as follows. When the thickness of the film d1 becomes larger, the cross-sectional area of the tip portion A of the upper core layer 6 S becomes larger. Therefore, magnetic saturation of the tip portion A of the upper core layer 6 can be suppressed, so that decrease in magnetic flux density can be suppressed.

According to thicknesses of the film d1 shown in FIG. 5 in the case of the absolute value of the OW characteristic being not less than 30 dB, when the magnetic pole straight length L1 was 3.5 $\mu$m, the thickness of the film d1 was not less than about 0.5 $\mu$m. When the magnetic pole straight length L1 was 6.5 $\mu$m, the thickness of the film d1 was not less than about 1.4 $\mu$m. Thus, the longer the magnetic pole straight length L1, the broader the range of the thickness of the film d1.

As shown in FIGS. 4 and 5, when the saturation magnetic flux density Bs is fixed to be 1.4 T and the width of the tip portion A (a track width; Tw) is fixed to be 2 $\mu$m, the thickness of a film d1 is preferably in a range of 0.5 to 3.7 $\mu$m, and more preferably in a range of 1.4 to 2.8 $\mu$m. Therefore, in accordance with the present invention, the value calculated by the equation S (cross-sectional area)×Bs (saturation magnetic flux density) is preferably in a range of 1.5 to 10.5 $\mu m^2 \cdot T$, and more preferably in a range of 4.0 to 8.0 $\mu m^2 \cdot T$.

Next, while the magnetic pole straight length L1 was varied, the relationships between the magnetic pole straight length L1 and NLTS and OW characteristics were evaluated in the present invention. In the experiment, the upper core layer 6 was made of an $Fe_{55}Ni_{45}$-based alloy having a saturation magnetic flux density Bs of 1.4 T, and the thickness of the film d1 of the tip portion A of the upper core layer 6 and the track width Tw were fixed to be 2.5 $\mu$m, and 2 $\mu$m, respectively.

Figure 6:
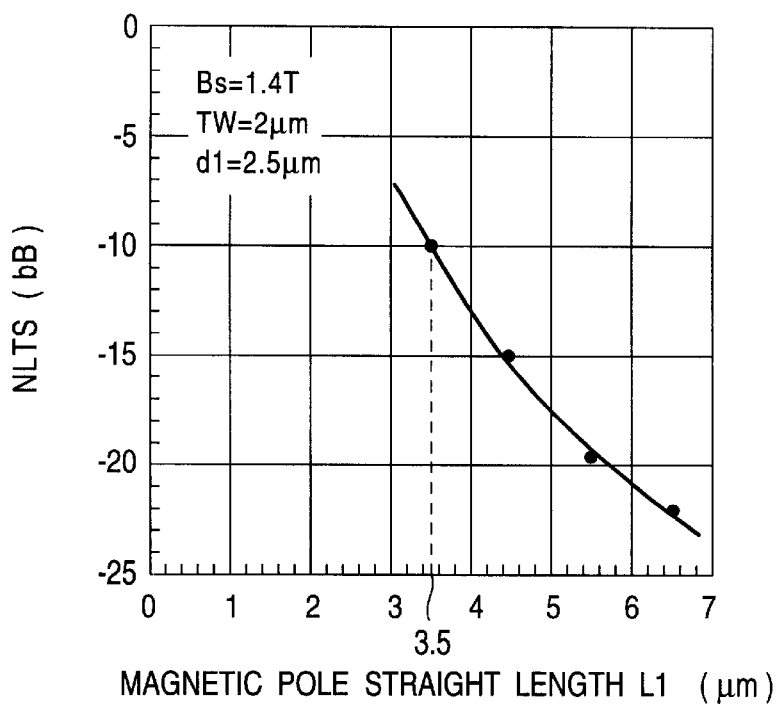
FIG. 6 shows the relationship between a magnetic pole straight length L1 at the tip portion of the upper core layer and NLTS characteristic.

As shown in FIG. 6, the larger the magnetic pole straight length L1, the larger the absolute value of the NLTS characteristic, so that the NLTS characteristic became excellent because of being capable of reducing the strength of a demagnetizing field. Further, as shown in FIG. 6, in order for an absolute value of NLTS characteristic to be not less than 10 dB, it is clear that the magnetic pole straight length L1 should not be less than about 3.5 μm.

Figure 7:
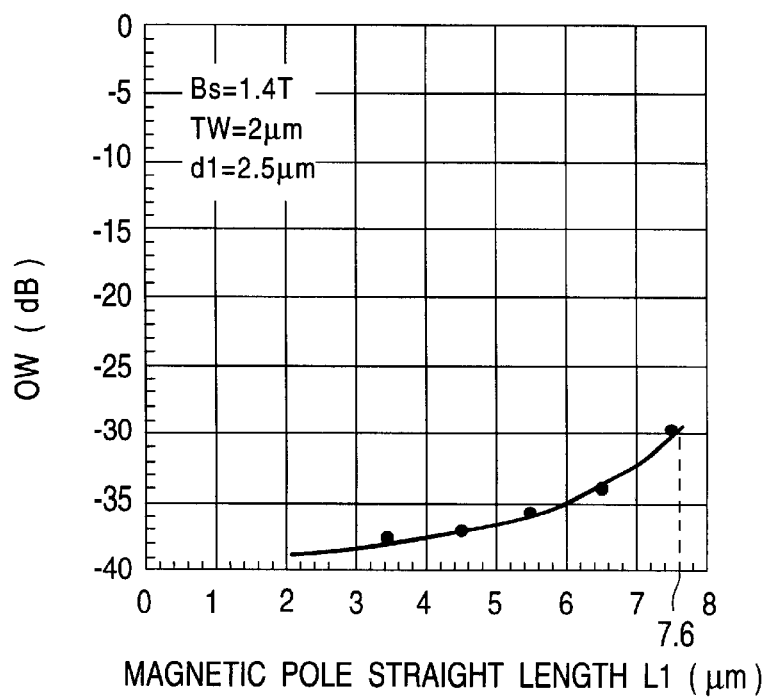
FIG. 7 shows the relationship between a magnetic pole straight length L1 at the tip portion of the upper core layer and OW characteristic.
Figure 8:
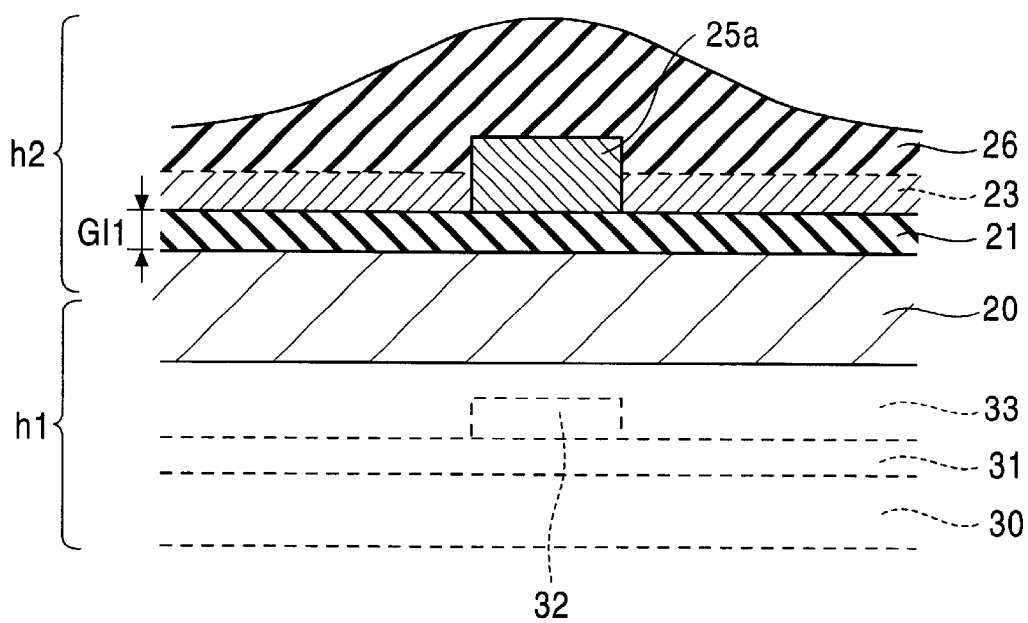
FIG. 8 is an enlarged detail of a conventional thin film magnetic head.
Figure 9:
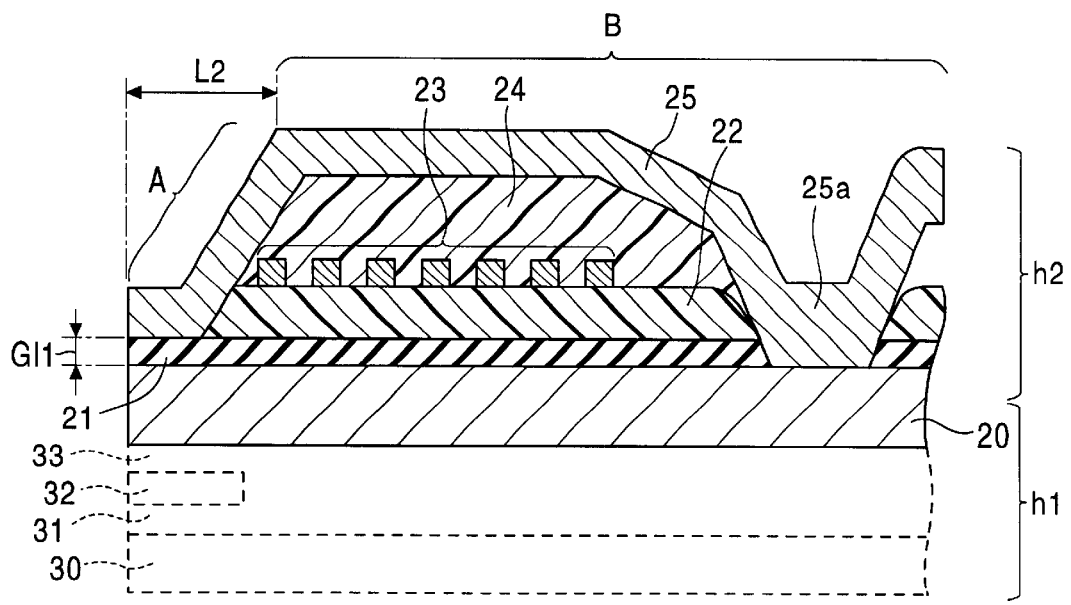
FIG. 9 is a longitudinal sectional view of the thin film magnetic head shown in FIG. 8.
Figure 10:
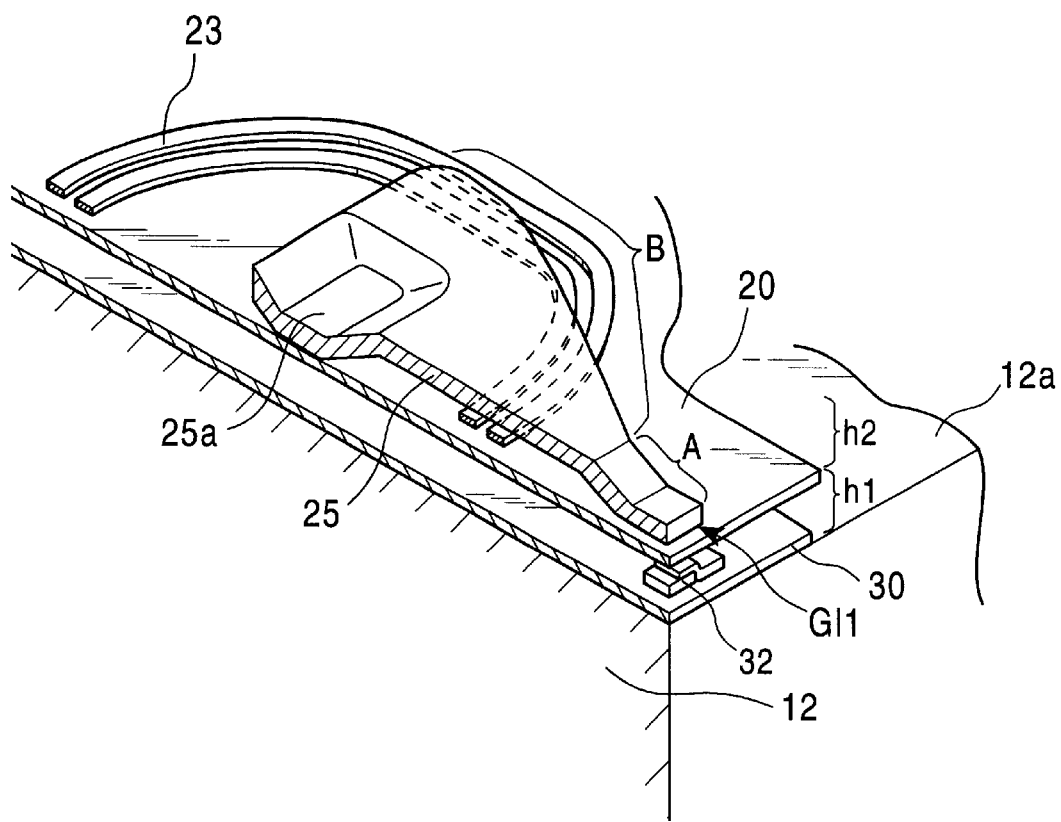
FIG. 10 is a fragmentary isometric view of an entire construction of the conventional thin film magnetic head.

In addition, as shown in FIG. 7, the larger the magnetic pole straight length L1, the smaller the absolute value of the OW characteristic, so that the OW characteristic became inferior because of being easily affected by magnetic saturation and because of decreasing in magnetic flux density.

Further as shown in FIG. 7, it is clear that the magnetic pole straight length L1 is not more than about 7.6 μm in order for an absolute value of the OW characteristic to be not less than 30 dB. Thus, in the present invention, the preferable magnetic pole straight length L1 is determined to be in a range of 3.5 to 7.6 μm.

Thus, on the basis of experimental results shown in FIGS. 4 to 7, the product (S×Bs) of the cross-sectional area of the tip portion A of the upper core layer 6 (S) and the saturation magnetic flux density thereof (Bs) is preferably small and the magnetic pole straight length L1 is preferably large to obtain an excellent NLTS characteristic. On the other hand, to obtain an excellent OW characteristic the product (S×Bs) is preferably large and the magnetic pole straight length L1 is preferably small.

In accordance with the present invention, in order to simultaneously obtain excellent NLTS and OW characteristics, substantially, in order for the absolute values of the NLTS characteristic and the OW characteristic to be not less than 10 dB and not less than 30 dB, respectively, the following ranges are determined. The preferable value calculated by the equation S×Bs is determined to be in a range of 1.5 to 10.5 $\mu m^2 \cdot T$, and more preferably in a range of 4.0 to 8.0 $\mu m^2 \cdot T$ on the basis of FIGS. 4 and 5. In addition, the preferable magnetic pole straight length L1 is determined to be in a range of 3.5 to 7.6 μm.

FIG. 1 is an enlarged detail of a thin film magnetic head according to an embodiment of the present invention showing a facing surface facing a recording medium. FIG. 2 is a longitudinal sectional view of the thin film magnetic head shown in FIG. 1. FIG. 3 is an isometric view roughly showing an entire construction of the thin film magnetic head provided on a slider 12 in accordance with the present invention.

As shown in FIG. 3, the thin film magnetic head in accordance with the present invention is provided at a trailing side end surface 12a of the slider 12 which constitutes a floating type magnetic head, and represents a magnetoresistive and inductive combined-type thin film magnetic head (hereinafter simply referred to as a thin film magnetic head) in which a read-out head h1 and an inductive head for writing h2 are laminated.

The read-out head h1 detects a leakage magnetic field from a recording medium such as a hard disk using a magnetoresistive effect, and reads a recording signal. As shown in FIG. 3, a lower shielding layer 8 which is made of a soft magnetic material is formed at the trailing side end surface 12a of the slider 12.

As shown in FIGS. 1 and 2, a magnetoresistive device layer 10 is provided on the lower shielding layer 8 by interposing a lower gap layer 9 which is made of a nonmagnetic material such as $Al_2O_3$ (aluminum oxide). The magnetoresistive device layer 10 has an anisotropic magnetoresistive (hereinafter referred to as AMR) structure or a giant magnetoresistive (hereinafter referred to as GMR) structure.

An upper shielding layer 1 which is made of a soft magnetic material such as an Fe—Ni based alloy is formed on the magnetoresistive device layer 10 by interposing an upper gap layer 11 which is made of a nonmagnetic material. The read-out head h1 is in a stacked state in which the lowest layer is the lower shielding layer 8 and the most upper layer is the upper shielding layer 1. The upper shielding layer 1 is also used as a core layer at a leading side of an inductive magnetic head for writing h2 (a lower core layer) in the present invention.

As shown in FIGS. 1 to 3, a gap layer 2 (a nonmagnetic material layer) which is made of aluminum oxide or the like is formed on the lower core layer 1. Furthermore, coil layers 4 which are subject to pattern formation so as to be two-dimensionally helical are formed on the gap layer 2 by interposing an insulating layer 3 which is made of polyimide or a resist material (see FIG. 2). The coil layers 4 are made of a nonmagnetic conductive material having a low electrical resistance such as copper (Cu).

In addition, the coil layers 4 are enveloped in an insulating layer 5 which is made of polyimide or a resist material (see FIG. 2). An upper core layer 6 which is made of a soft magnetic material is formed on the insulating layer 5 which is a core portion of the trailing side of the inductive magnetic head h2. As shown in FIG. 3, the upper core layer 6 comprises a tip portion A having a constant width (Tw) and a rear end portion B in which its width gradually becomes larger in the rearward direction starting at the tip portion A.

As shown in FIG. 2, at a facing portion of the tip portion A, the upper core layer 6 is provided on the lower core layer 1 by interposing the nonmagnetic material layer 2 and faces onto a recording medium. A magnetic gap having a height of G11 which applies a recording magnetic field to a recording medium is provided at the facing portion. As shown in FIGS. 2 and 3, a base end portion 6a of the upper core layer 6 is magnetically brought into contact with the lower core layer 1. Furthermore, a protective layer 7 which is made of aluminum oxide or the like is formed on the upper core layer 6 (See FIG. 1).

A recording current is applied to the coil layers 4 in the inductive magnetic head h2 and a recording magnetic field is induced by the coil layers 4 toward the lower core layer 1 and the upper core layer 6. Then, a magnetic signal is recorded on a recording medium such as a hard disk by a leakage magnetic field between the lower core layer 1 and the upper core layer 6 at the magnetic gap having a height of G11. In addition, the gap length G11 of the inductive magnetic head h2 is formed so as to be as short as possible in order to record a magnetic signal at high density on a recording medium such as a hard disk at the inductive magnetic head h2.

As shown in FIGS. 1 and 2, a thickness of the film at the tip portion A of the upper core layer 6 is indicated by a width d1. In the present invention, when a cross-sectional area which is obtained by multiplying a thickness of the film d1 by the track width Tw (a width of the tip portion A, see FIG. 1) is defined as S and a saturation magnetic flux density of the soft magnetic material consisting the upper core layer 6 is defined as Bs, the product (S×Bs) is preferably in a range of 1.5 to 10.5 $\mu m^2 \cdot T$. In this case, T indicates tesla.

In addition, in accordance with the present invention, a value calculated by the equation represented by S×Bs is preferably in a range of 4.0 to 8.0 $\mu m^2 \cdot T$. The range of the product (S×Bs) is determined on the basis of experimental results shown in FIGS. 4 and 5.

The NLTS and OW characteristics greatly depend on the above-described value represented by the equation S×Bs, and furthermore, are affected by a length of the tip portion A, that is, a length of a magnetic pole straight length L1 shown in FIG. 2. Thus, in the present invention, the preferable magnetic pole straight length L1 is determined to be in a range of 3.5 to 7.6 $\mu m$ on the basis of experimental results shown in FIGS. 6 and 7.

In accordance with the present invention, a product (S×Bs) is in a range of 1.5 to 10.5 $\mu m^2 \cdot T$, and more preferably in a range of 4.0 to 8.0 $\mu m^2 \cdot T$, and a value of a length of a magnetic pole straight length L1 is in a range of 3.5 to 7.6 $\mu m$, so that excellent NLTS and OW characteristics are simultaneously obtained. Substantially, an absolute value of the NLTS characteristic can be not less than 10 dB, and an absolute value of the OW characteristic can be not less than 30 dB. As a result, in accordance with the present invention, a thin film magnetic head capable of simultaneously obtaining satisfactory NLTS and OW characteristics can be manufactured even at a high recording density.

What is claimed is:

1. A combination type thin film magnetic head comprising:

a writing head comprising a lower magnetic core layer and an upper magnetic core layer, said lower and upper core layers separated by a coil layer for inducing a recording magnetic field in both the lower and upper core layers; and a reading head comprising a magnetoresistive layer;

wherein the upper core layer comprises a tip portion having a constant width starting from a facing portion facing onto a recording medium to the rearward direction which is distant from the recording medium, and a rear end portion which rearwardly becomes larger in width from the tip portion;

wherein a length dimension of the tip portion having the constant width in the distant direction from the recording medium is in a range of 3.5 to 7.6 $\mu m$; and wherein when a cross-sectional area of the tip portion is S, and a saturation magnetic flux density of a magnetic material consisting the upper core layer is Bs, the product of (S×Bs) is in a range of 1.5 to 10.5 $T \cdot \mu m^2$.

2. A thin film magnetic head according to claim 1, wherein the product (S×Bs) is in a range of 4.0 to 8.0 $\mu m^2 \cdot T$.

* * * * *